United States Patent
Carlisle et al.

[11] Patent Number: 6,076,974
[45] Date of Patent: Jun. 20, 2000

[54] OPTICAL FIBER CONNECTOR

[75] Inventors: Arthur Wallace Carlisle, Dunwoody; Jeffrey Harrison Hicks, Lilburn, both of Ga.

[73] Assignee: Lucent Technologies Inc., Murray Hill, N.J.

[21] Appl. No.: 09/152,381

[22] Filed: Sep. 14, 1998

[51] Int. Cl.⁷ ........................................ G02B 6/38
[52] U.S. Cl. .................. 385/76; 385/56; 385/60; 385/62; 385/81
[58] Field of Search .................. 385/56, 60, 66, 385/76, 62, 81, 87

[56] References Cited

U.S. PATENT DOCUMENTS

| | | | |
|---|---|---|---|
| 4,934,785 | 6/1990 | Mathis et al. | 350/96.21 |
| 5,285,510 | 2/1994 | Slaney | 385/78 |
| 5,311,609 | 5/1994 | Abe | 385/60 |
| 5,481,634 | 1/1996 | Anderson et al. | 385/76 |
| 5,675,682 | 10/1997 | De Marchi | 385/77 |

*Primary Examiner*—John D. Lee
*Assistant Examiner*—Sarah U Song

[57] ABSTRACT

An optical fiber connector for use with plastic optical fibers includes a housing having a longitudinal bore forming a flat end wall adjacent the fiber entrance end. A graduated coil spring member is seated against the wall and retained within the bore. The spring has a first, compression generating section, a second section of lesser diameter for grasping and holding the jacket of a jacketed plastic optic fiber, and a third section that locates and guides the bare fiber to the interface end of the coupler.

23 Claims, 4 Drawing Sheets

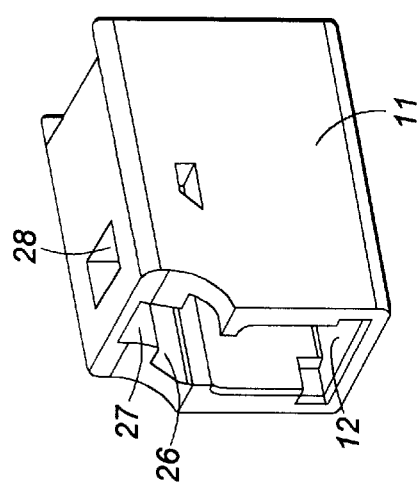
FIG. 1
(PRIOR ART)
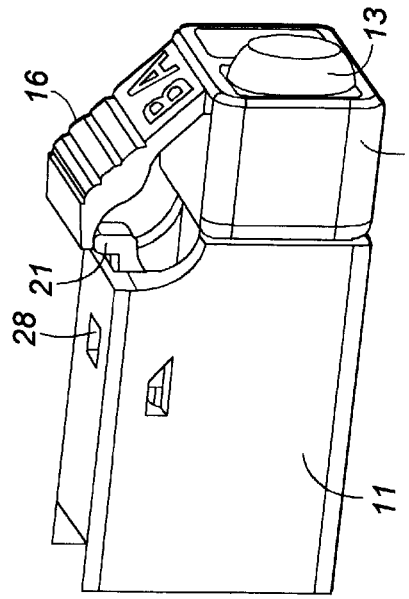
FIG. 2
(PRIOR ART)
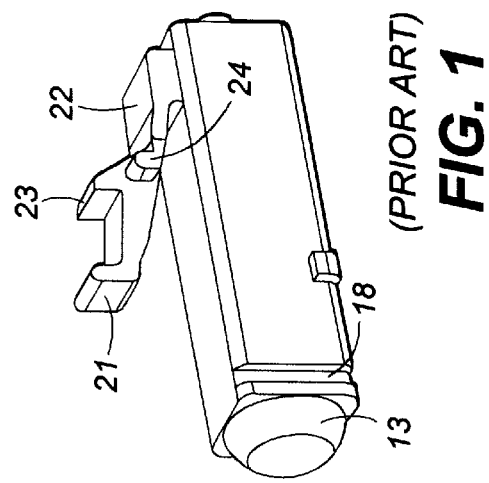
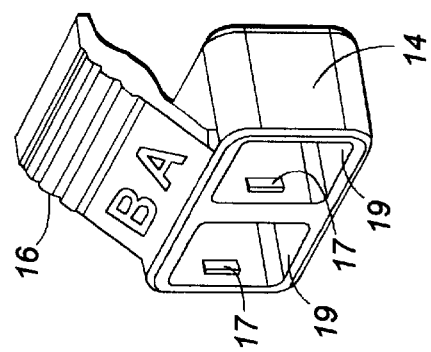

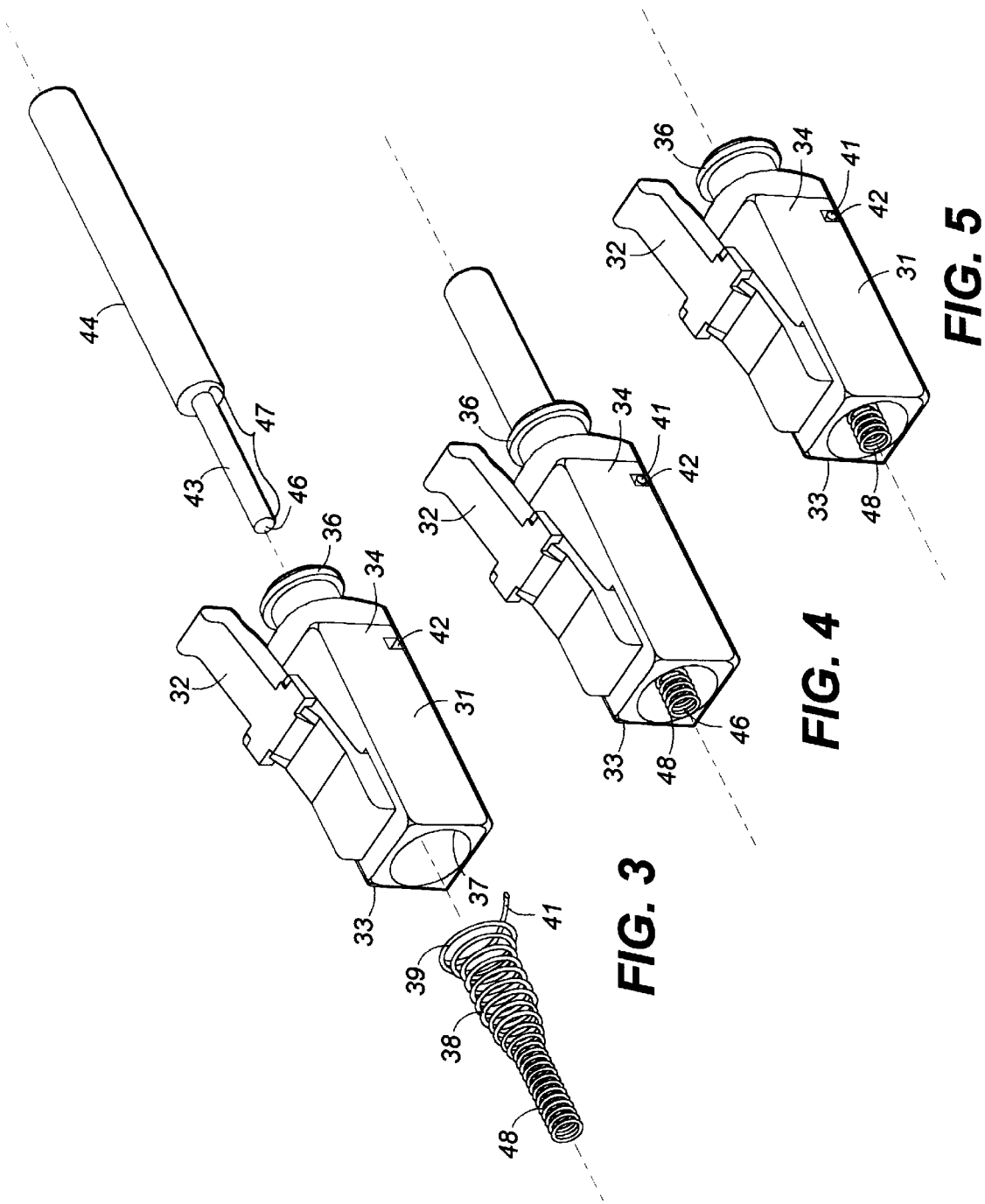

OPTICAL FIBER CONNECTOR

FIELD OF THE INVENTION

This invention relates to optical fiber connectors and, more particularly, to a connector assembly for use with plastic optical fiber which has a minimum number of components.

BACKGROUND OF THE INVENTION

Present day telecommunications technology utilizes, to an increasing extent, optical fibers for signal transmission. The use of optical fibers, in turn, requires numerous collateral components especially adapted to handle the light or optical transmission, among which are optical fiber connectors, which are essential to virtually all optical fiber systems. Connectors may be used to join segments of fibers together to create longer lengths; to connect a fiber or fibers to active devices forming part of the communication system such as radiation sources, detectors, amplifiers, repeaters, or the like; or to connect the fibers to various types of passive devices such as switches, dividers, or attenuators. It is highly desirable, if not necessary, that the connectors perform their function with a minimum of signal loss, and that the making of a connection be a simple and as quickly accomplished as possible. The central function of an optical fiber connector or connectors, which most often are in butting relationship, is the positioning and maintenance of two optical fiber ends so that their central cores are aligned and in contact with each other, thus insuring maximum transfer of optical signals from one fiber to the other. Achieving this desideratum is a particularly challenging task inasmuch as the light carrying region (the core) of an optical fiber is quite small, being on the order of eight microns (8 $\mu$m) diameter for single mode glass fiber. Another function of an optical fiber connector is to provide mechanical stability and protection of the actual connection in the working environment. Achieving maximum signal transfer (minimum insertion loss) is a function of the alignment of the fiber cores, the width of the gap between the fiber ends, and the surface condition of the fiber end faces. Stability and junction protection are generally functions of the connector design including the material used. For example, a connector generally includes a glass or ceramic cylinder which contains the fiber to be connected, and the end face of which is designed to butt against the end face of a similar cylinder in the mating connector. Such a cylinder is commonly called a ferrule, and it not only functions to align the core of the fiber, but, also, its end face is sufficiently smooth and flat to insure a uniform butting against the end face of the mating ferrule.

There are, at present, many different types of connectors in use, all of which are aimed at achieving low insertion loss within the connection, and stability. One such connector is shown in U.S. Pat. No. 4,934,785 of Mathis et al., and comprises a cylindrical ferrule, a base member which holds the ferrule, a compression spring, and a housing surrounding the ferrule and the spring. The ferrule is held rigidly in the housing by suitable adhesive, and the compression spring applies an axial force to the ferrule and housing sot hat the end face of the ferrule is maintained in contact with the mating ferrule of the second connector. Although such a connector performs its functions well, it has a high parts count assembled in a relatively complex arrangement. A high parts count means a more expensive connector, and, further, the risk of lost parts during assembly, especially in the field. With the increasing use of optical fibers as the transmission media of choice, there is a need for high density interconnect arrangements, hence, expensive connectors with a high parts count unduly increase the cost of such interconnection arrangements.

Another type of connector is shown in U.S. Pat. No. 5,481,634 of Anderson et al. and comprises a cylindrical ceramic ferrule contained in a plastic base member to form the fiber holding structure. The fiber holding structure is mounted within a cylindrical housing having an opening therein through which the ferrule protrudes. A cylindrical spring surrounds the base member and interacts with an interior surface of the housing to urge the ferrule axially outward from the housing opening. The housing has a cantilever type spring latch located on one exterior side of the connector which is manually operable and which mates with a shoulder within the receptacle to lock the connector therein. While this particular type of connector lends itself readily to miniaturization, it has a fairly high part count and is, therefore, subject to the same objections as the Mathis et al. connector. Additionally, the compression spring is, in essence, a loose part, and therefore can easily be misplaced or lost during assembly of the connector.

Both of the aforementioned connectors are representative of prior art types, virtually all of which use coil springs to apply the contacting force. In many connectors, the springs also compensate for over-travel. That is, when a connection is made with an LC type connector (Anderson et al.), the ferrule first seats on the optical interface of the mating ferrule (or active device). It is then necessary for the plug housing to continue to advance until the cantilever latch clears the latching shoulder on the receptacle or adapter. The spring absorbs this additional axial advance and once the latch is engaged, the spring, being compressed, continues to apply an axial force between the latch and the plug body to maintain intimate contact at the interface.

Glass optical fibers have, heretofore, been primarily used to bring optical signals to subscriber premises, where they are transformed into electrical signals for distribution throughout the premises. However, there has been a move toward extending the optical signals into and throughout the subscriber premises due to the development of plastic optical fiber (POF). POF has many advantages over glass optical fiber (GOF) for such use. POF is not as brittle as GOF, and does not require extremes of care in handling. POF is less expensive than GOF, thus making it attractive for local usage. Also, POF does not normally require the precision of alignment required by GOF. On the other hand, POF has higher signal loss, not having the optical transmissivity of GOF, and hence is preferably used only in short transmission spans, such as within the subscriber premises. It is anticipated that various connections to the several types of apparatus are to be made by the subscriber or customer, hence, the connections will be facilitated by less complicated or sophisticated connectors. Such connections may be made to VCR's, television sets, camcorders, and other types of domestic equipment as well as to telephones, computers, and the like.

In U.S. patent application Ser. No. 09/019,240 of Carlisle et al., now U.S. Pat. No. 6,017,154, there is disclosed a connector for terminating an optical fiber cable, that is especially designed for use with plastic optical fiber. The connector comprises a plug having a bore extending therethrough which, in turn, has an enlarged diameter threaded portion extending from within the plug to the cable entrance end. The diameter of the threaded portion is such that the threads grip the soft resilient jacket of the POF cable. Inasmuch as the jacket is bonded to the fiber (in POF), when the jacket is screwed into the plug, the POF is firmly held therewithin. Such an arrangement works quite well, however, it requires the molding or cutting of threads within the plug.

What is needed, and what the prior art appears to be lacking, is an optical connector having a low part count, reduced size, and which is readily insertable and removable from an associated receptacle without a tool or the need to grasp the opposite sides thereof which is difficult to do when a number of connections are crowded together, while insuring that positive optical contact is made with the mating connector or equipment terminal and, further, is readily and quickly applied to, for example, a plastic optical fiber or cable.

SUMMARY OF THE INVENTION

The present invention and the principles thereof are shown as incorporated in an LC type connector as modified for use with plastic optical fiber (POF) of the general configuration as shown in the aforementioned Anderson et al. U.S. Pat. No. 5,481,634. It is to be understood that the principles are readily adaptable for use in other types of connectors as well.

The connector of the invention comprises a standard LC connector housing, preferably of suitable plastic material, having a cable or fiber entrance end and an interface or contact end. At the cable entrance end is an opening for jacketed POF. At the interface end is an enlarged bore which extends axially into the housing toward the cable entrance end, and terminates in a flat wall portion adjacent the end of the housing.

Within the enlarged bore portion is a coil spring having, in sequence from the flat wall toward the contact end, a first diameter portion, a tapered transition portion, a second smaller diameter portion, a tapered portion, and a third still smaller diameter portion extending to the contact end of the housing. The first diameter portion is seated on the flat wall and held in place and against rotation within the housing by a keeper member in the form of a tang, for example, extending therefrom which fits in a slot within the housing. The inner diameter of the first diameter portion is greater than the diameter of a jacketed fiber so that it does not interfere with a jacketed fiber inserted into the holder.

The inside diameter of the second diameter portion is such that it engages the jacket of the jacketed cable or fiber sufficiently that the cable may be threaded into the spring and firmly held thereby, the jacket having sufficient resilience to make threading possible. Inasmuch as the jacket is affixed to the plastic fiber, the jacket and the fiber are thus held firmly by the spring, and are movable longitudinal with compression and extension of the spring.

The tapered portion of the spring is a transition from the second diameter portion to the third diameter portion which was an inside diameter slightly greater than the bare plastic fiber diameter, so that a length of bare fiber is a slip fit therein and is held centered by the spring. In use, the fiber is stripped of its jacket for a length slightly greater than the length of the transition or tapered portion and the third diameter portion so that the end thereof protrudes slightly beyond the end of the spring at the contact end. The protrusion allows for dressing and polishing the end face of the fiber and also prevents the end of the spring from interfering with the contact between the fiber and the apparatus, such as another fiber, with which it is in butting connection. The first diameter portion of the spring functions in the manner of the spring in the standard LC connector, furnishing a forward axial bias to the fiber, and compressing when the connection is made.

The invention is, therefore, a connector having only two parts, i.e., the housing and the spring, which can easily and quickly be mounted on the end of a plastic fiber. The connector contains the spring, hence, there is no assembling of the connector necessary, and installation can be made with ease. This is especially desirable where, as expected, the customer is making the connection.

These and other features and advantages of the present invention will be more readily apparent from the following detailed description, read in conjunction with the accompanying drawings.

DESCRIPTION OF THE DRAWINGS

FIG. 1 is an exploded perspective view of an LC type connector such as is shown in the aforementioned Carlisle et al. application;

FIG. 2 depicts the assembled connector of FIG. 1;

FIG. 3 is an exploded perspective view of the connector of the present invention;

FIG. 4 is a perspective view of the connector of FIG. 3 as assembled and as affixed to the end of an optical fiber;

FIG. 5 is a perspective view of the connector of FIGS. 3 and 4 without the cable or fiber, but assembled and ready for use;

DETAILED DESCRIPTION

Figure 6:
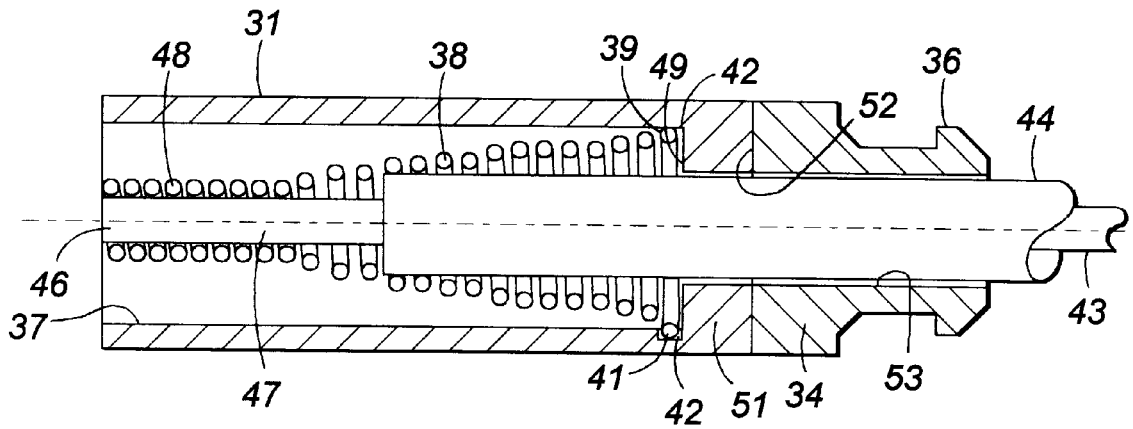
FIG. 6 is a plan cross-sectional view of the housing of the connector showing the cable mounted therein.

FIG. 1 depicts the connector end adapter arrangement shown in the aforementioned U.S. patent application Ser. No. 09/019,242 of Carlisle et al., now U.S. Pat. No. 6,024,498, which is incorporated herein by reference. The arrangement shown in FIG. 1 comprises an adapter member 11 having a bore 12 extending therethrough for receiving connector member 13. A trigger holding member 14 having a cantilevered trigger 16 affixed to one end thereof is latched to connector 13 by latching means 17 on member 14 which may engage grooves 18 at one end of connector 13. Trigger holding member 14 is shown in FIG. 1 as a duplex member, i.e., having two openings 19 for receiving connectors 13. On the other hand, adapter 11 is shown as a single connector receiving member. Although it, too, may be a duplex member. Connector 13 has a cantilevered latching arm 21 having a latching projection 23 thereon, and radiused camming lobes 24, the operation of which is fully described in the Carlisle et al. patent. As best seen in FIG. 2, trigger 16 overlies the distal end of arm 21 for actuation thereof.

Bore 12 in adapter 11 is configured to receive connector 13 therein, and channels 26 and 27 accommodate the camming lobes 24 and latching arm 21, respectively. An opening 28 forms a shoulder for engagement by latching tab 23 to hold connector 13 securely within adapter 11. It is to be understood that adapter 11 may take any of a number of forms including, for example, a wall socket, or socket means on the apparatus to which connection is to be made, as well as splicing arrangements or other circuit components.

The connector arrangement shown in FIGS. 1 and 2 represent an improvement over other types of LC connectors in that, for example, it has fewer parts than other prior art LC connectors. The present invention, as depicted in FIGS. 3 through 8, represents a similar improvement over prior art LC type connectors for use with plastic optical fiber (POF). As shown in FIG. 3, the connector assembly comprises a housing member 31 having a latching arm 32 extending therefrom at an angle, similar to latching arm 21 in FIGS. 1 and 2. Housing 31 has a front or interface end 33 and a rear or cable (or fiber) entrant end 34. Affixed to end 34 is a bend limiting boot retainer 36 which functions to hold a bend limiting boot (not shown) which may be affixed to the cable in place. Interface end 33 has a first bore 37 of a first diameter extending into housing 31 which, as is seen more clearly in FIGS. 6 and 7 and which will be discussed hereinafter, terminates in a flat surface (not shown in FIGS. 3, 4, and 5) which serves as a seat for a cable holding and fiber centering spring 38. Spring 38, which is preferably of a material such as beryllium copper or stainless steel, for example, has a large diameter seating end 39 adapted to seat within the bore on the flat surface and which has a retainer or keeper member in the form of, for example, a tang 41 which, when spring 38 is within the bore 37 and seated on the flat surface, extends into a slot 42 as seen in FIGS. 4 and 5 to hold spring 38 seated within housing 31. Spring 38 is seated within housing by the operator or maker by his bending tang 41 sufficiently to provide clearance between spring 38 and bore 37, then pushing the spring in while rotating it clockwise. The sides of the bore 37 will maintain the bend in the tang until the spring 38 seats. Further rotation will cause the tang 41 to encounter slot 42 where its natural resilience causes it to snap into the slot 42 so that it straightens out, thereby locking spring 38 in place within housing 31.

A POF fiber 43 having a resilient plastic jacket 44, an end face 46, and an unjacketed portion 47 is inserted through boot retainer 36 into housing 31 where it is guided by the bore of the spring until jacket 44 encounters the interior of the spring. Twisting of the connector onto the fiber and jacket, which are affixed to each other, threads the jacket into the spring where it is tightly held. The unjacketed length 47 of fiber 43 extends to the end of the spring, or slightly beyond, being held centered by a reduced diameter portion 48 of the spring, as will be discussed more fully hereinafter. The connector of the invention mounted on the end of the jacketed fiber, is shown in FIG. 4, while FIG. 5 illustrates the connector ready for use. The connector shown in FIG. 5 may be assembled on site by the installer or customer. However, it is much more feasible that the connector as shown in FIG. 5 be supplied to the installer or user. This lessens the risk of lost springs, for example, and obviates the necessity of installing the spring.

FIG. 6 is a cross-sectional view of the connector of the invention mounted on the end of fiber 43 and its jacket 44. As can be seen, bore 37 terminates short of the end 34 of housing 31 in a flat face 49 of an end wall 51 thus formed. Flat face 49 forms a seat for the large diameter end 39 of spring 38, and tang 41 rides in slot 42, thereby holding spring 38 in place within the bore 37. A cable passage 52, of a diameter less than that of bore 37 passes through wall 51 to permit passage of the cable, or jacketed fiber, therethrough. Boot retainer 36 has a mating passage 53 for the cable. It is to be understood that boot retainer 36 is an optional member. That is, it is not necessary to the function of the connector of the invention, although in practice it does function, in conjunction with a bend limiting boot (not shown) to prevent too sharp bends of the fiber. It can be seen that the spring has several sections of differing diameters joined by transition sections, which are explained in detail with reference to FIG. 8.

Figure 7:
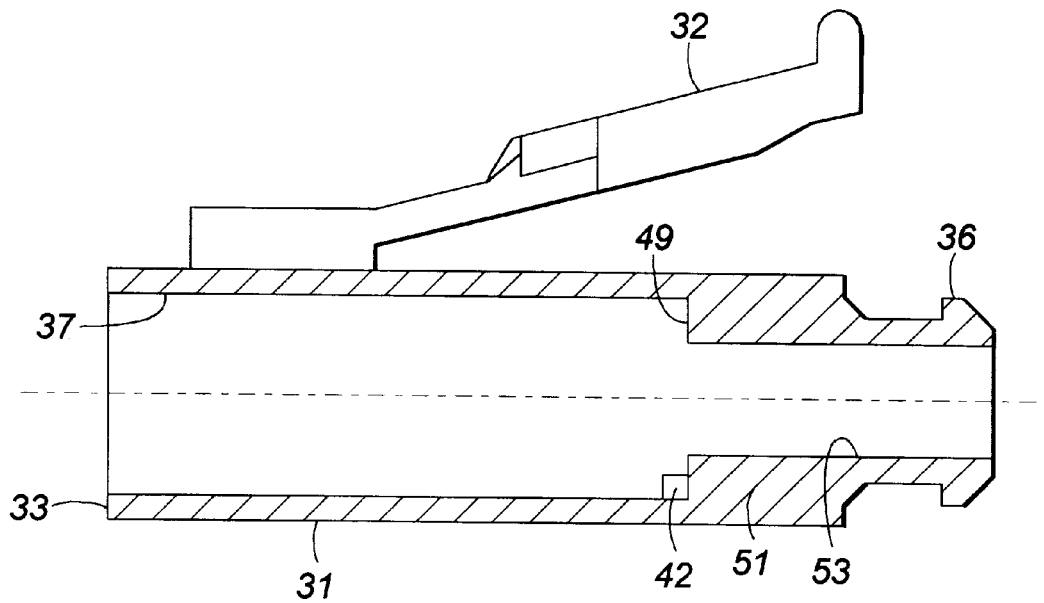
FIG. 7 is a side elevation cross-sectional view of the housing of the connector of the invention.

In FIG. 7 there is shown a variation of the arrangement of FIG. 6 wherein the housing 31 and the boot retainer 36 are molded in one piece. In this arrangement, wall 51 is somewhat more elongated than in the arrangement of FIG. 6. From an economic standpoint, the arrangement of FIG. 7 is to be preferred since it only requires one die, and eliminates the necessity of affixing the boot retainer 36 to the end of housing 31. It also eliminates the risk of lost parts.

Figure 8:
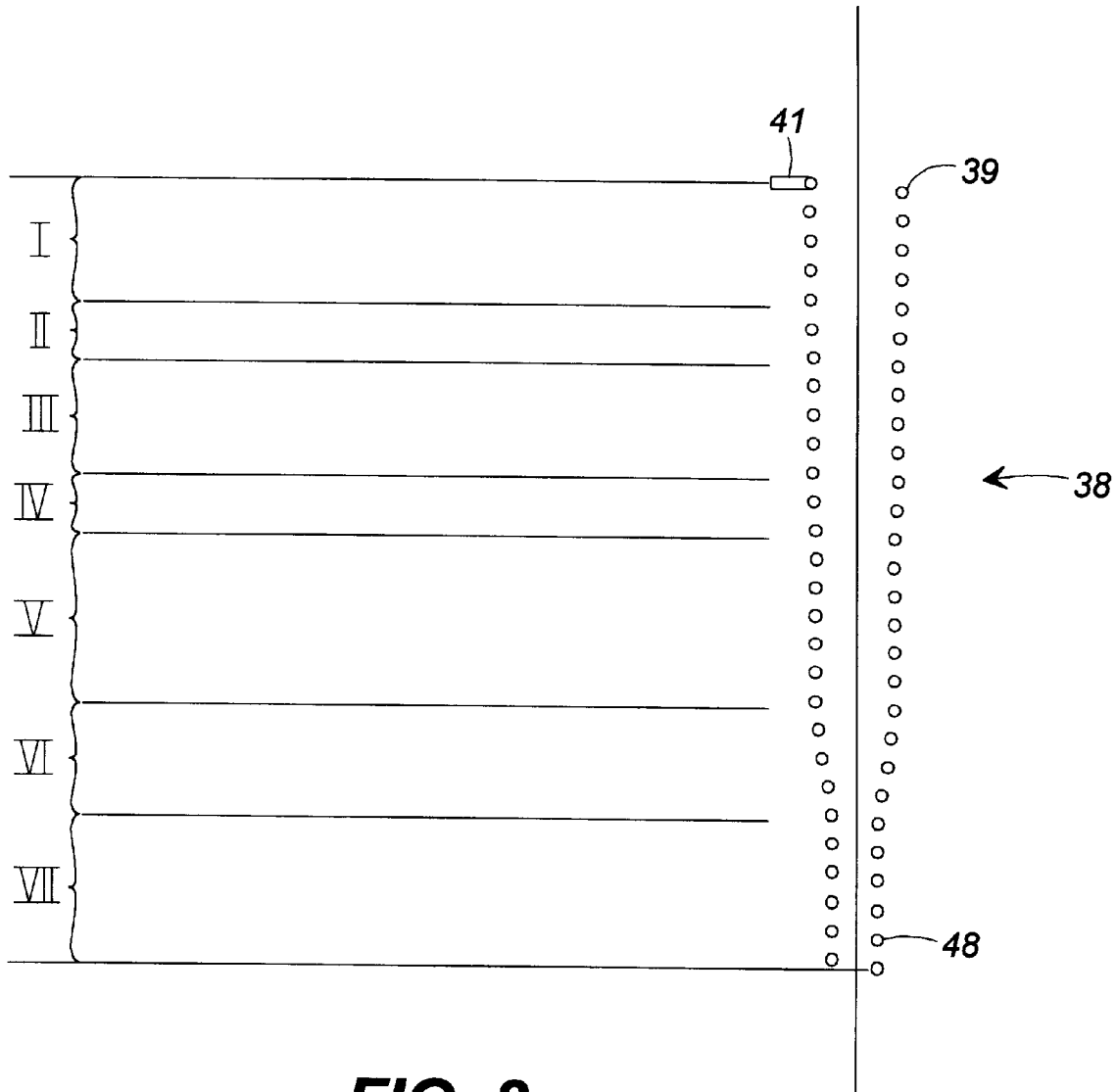
FIG. 8 is a diagrammatic view of the spring member used in the connector of the invention.

FIG. 8 depicts diagrammatically the configuration of spring 38 which is preferably of suitable spring metal, such as, for example, beryllium copper or stainless steel. As can be seen, spring 38 has seven sections I through VII arrayed consecutively along its length. For a jacketed plastic optical fiber wherein the bare fiber has a diameter of approximately thirty-nine thousandths of an inch (0.039") and the jacket has an outside diameter (O.D.) of eighty-five thousandths of an inch (0.085"), it has been found that a coil spring 38 of twenty-eight turns functions well in holding the cable or fiber within the connector and yet supplying the necessary spring action for an LC connector. For a twenty-eight and one-half turn spring 38 of approximately 0.465" length, section I has an O.D. of approximately 0.128" and an inside diameter (I.D.) of 0.10" for five turns (turns 24 and 28). Section II is a transition section of approximately one turn (turn 23) to section III which has an I.D. of approximately 0.090" for five turns (turns 18 through 22). Section IV is a transition section of approximately one turn (turn 17) to section V which has an I.D. of approximately 0.080" for approximately seven turns (turns 10 through 16). Section VI is a transition section of approximately three turns (turns 7 through 9) to section VII which has an I.D. of approximately 0.040" for approximately (turns 1 through 6). Section I functions to align the spring 38 within the bore 37 and supplies the necessary compression force in conjunction with sections II and III on the fiber to insure positive connection, which is discussed in the aforementioned Carlisle et al. application, and sections IV and V engage and affix the jacket. Inasmuch as sections I, II, and III supply the necessary spring action, principally section III, they may be considered as forming a single spring action section. Section VII has an I.D. (0.040") only slightly greater than the O.D. (0.039") of the bare fiber which is a slip fit therein and functions as a guide and alignment means therefor. It is to be understood that the dimensions given herein are characteristic of a preferred embodiment. Obviously, for different diameter of fiber and different diameter of jacket, the I.D.'s of the different sections and their number of turns may be different, but the principles involved remain the same.

The connector of the inventions, as disclosed herein, only has two parts, or three if a boot retainer is used, and yet performs the necessary fiber containment and alignment functions and the spring action typical of LC couplers. With the spring already in place, the user simply has to screw the connector on to the end of the fiber to prepare the fiber for connection.

In concluding the detailed description, it should be noted that it will be obvious to those skilled in the art that many variations and modifications may be made to the preferred embodiment without departure from the principles of the present invention. All such variations and modifications are intended to be included herein as within the scope of the present invention as claimed. Further, in the claims hereafter, the corresponding structures, materials, acts, and equivalents of all means or step plus function elements are intended to include any structure, material, or acts for performing the functions with other elements as specifically claimed.

What is claimed is:

1. A connector for attachment to an optical fiber cable which comprises at least one plastic optical fiber of a first diameter surrounded by a jacket of a second diameter affixed thereto, said connector comprising:

an elongated housing member having a an interface end and a cable entrant end and a central axis;

a first bore having a third diameter extending axially from said interface end toward said cable entrant end over a portion of the length of said housing and terminating in a substantially flat face within said housing member;

a second bore having a fourth diameter greater than said second diameter and less than said third diameter extending from said flat face to said cable entrant end;

an elongated spring member having an end seated on said flat face and axially extending toward said interface end;

said spring member having a first section seated on said flat face, said first section having a first inside diameter greater than the second diameter of the jacketed fiber, and a second section having a second inside diameter less than the second diameter of the jacketed fiber.

2. A connector as claimed in claim 1 wherein said spring member has at least one tapered transition section between said first section and said second sections.

3. A connector as claimed in claim 1 wherein said spring member has a third section having a third inside diameter less than the second inside diameter and greater than the first diameter of the fiber.

4. A connector as claimed in claim 3 wherein said spring member has at least one tapered transition section between said second section and said third section.

5. A connector as claimed in claim 1 wherein said spring member has a tang extending from the seated end thereof.

6. A connector as claimed in claim 5 wherein said housing member has a slot therein extending from said bore adjacent said flat face for receiving said tang.

7. A connector as claimed in claim 1 and further comprising a latching member on said housing for securing said housing to an associated adapter.

8. A connector as claimed in claim 7 wherein said latching member comprises an arm having a proximal end affixed to the exterior of said housing and a free distal end spaced from said housing.

9. An elongated spring for use in an optical fiber connector for jacketed optical fiber, said spring comprising disposed along its length from a first end to a second end:

a first elongated section having an inside diameter greater than the diameter of the optical fiber jacket; and a second elongated section having an inside diameter over at least a portion of its length that is less than the diameter of the fiber jacket and greater than the diameter of the bare optical fiber.

10. An elongated spring as claimed in claim 9 and further comprising a third elongated section between said second section and said second end, said third section having an inside diameter less than the inside diameter of said second section and greater than the diameter of the bare optical fiber, said inside diameter being such that the bare fiber is a slip fit within said third section.

11. An elongated spring as claimed in claim 9 and further comprising a keeper member at the first end of said spring.

12. An elongated spring as claimed in claim 11 wherein said keeper member is a projecting tang.

13. An elongated spring as claimed in claim 9 wherein said first section and said second section are joined by a tapered transition section.

14. An elongated spring as claimed in claim 10 wherein said second section and said third section are joined by a tapered transition section.

15. An elongated spring as claimed in claim 9 wherein said spring is a coil spring of metallic material.

16. An elongated coil spring having a plurality of turns for use in optical fiber connector for jacketed plastic optical fiber, said spring comprising, disposed in seriatim along its length from a first end to a second end:

a first section having an inside diameter greater than the diameter of the optical fiber jacket;

a first transition section;

a second section having an inside diameter less than the inside diameter of said first section and a slightly greater than the diameter of the optical fiber jacket;

a second transition section;

a third section having an inside diameter slightly less than the diameter of the optical fiber jacket;

a third transition section; and a fourth section having an inside diameter less than the diameter of the fiber jacket and dimensioned to receive the bare optical fiber in a slip fit.

17. An elongated coil spring as claimed in claim 16 wherein said first section comprises approximately five turns of said coil spring.

18. An elongated coil spring as claimed in claim 16 wherein said second section comprises approximately five turns of said coil spring.

19. An elongated coil spring as claimed in claim 16 wherein said third section comprises approximately seven turns of said coil spring.

20. An elongated coil spring as claimed in claim 16 wherein said fourth section comprises approximately six turns of said coil spring.

21. An elongated coil spring as claimed in claim 16 wherein said first and second transition sections each comprises approximately one turn of said coil spring and said third transition section comprises approximately three turns of said coil spring.

22. An elongated coil spring as claimed in claim 16 and further comprising a keeper member on the first turn of said first section.

23. A method of assembling an optical fiber connector which has a housing having a bore therein terminating in a flat interior surface and a retainer slot adjacent the flat surface, and a coil spring member having a first end adapted to seat on the flat surface and having a first end with a keeper member extending therefrom, the method comprising:

temporarily bending the keeper member to allow insertion of the first end of the spring into the bore;

pushing the spring into the housing while rotating it until the first end of the spring is seated on the flat surface; and continuing to rotate the spring until the keeper member enters the retainer slot to affix the spring within the housing.

* * * * *